United States Patent
Danziger et al.

(10) Patent No.: US 10,792,132 B2
(45) Date of Patent: Oct. 6, 2020

(54) IMPLANT PLACEMENT KEY

(71) Applicant: PALTOP ADVANCED DENTAL SOLUTIONS LTD, Caesarea (IL)

(72) Inventors: Azarya Danziger, Elon Moreh (IL); Mordechai Mor Miles, Pardesiya (IL); Michael Klein, Maale Adumim (IL); Shlomo Hillel, Petach Tiqva (IL)

(73) Assignee: PALTOP ADVANCED DENTAL SOLUTIONS LTD., Caesarea (IL)

( * ) Notice: Subject to any disclaimer, the term of this patent is extended or adjusted under 35 U.S.C. 154(b) by 0 days.

(21) Appl. No.: 15/906,081

(22) Filed: Feb. 27, 2018

(65) Prior Publication Data

US 2018/0263736 A1 Sep. 20, 2018

Related U.S. Application Data

(60) Provisional application No. 62/473,577, filed on Mar. 20, 2017.

(51) Int. Cl.
*A61C 8/00* (2006.01)
*A61C 1/08* (2006.01)

(52) U.S. Cl.
CPC ............ *A61C 8/0066* (2013.01); *A61C 1/084* (2013.01); *A61C 8/006* (2013.01); *A61C 8/0057* (2013.01); *A61C 8/0089* (2013.01)

(58) Field of Classification Search
CPC ....... A61C 8/066; A61C 1/084; A61C 8/0057; A61C 8/006; A61C 8/0089; A61C 1/082
See application file for complete search history.

(56) References Cited

U.S. PATENT DOCUMENTS

| | | | |
|---|---|---|---|
| 5,105,690 A * | 4/1992 | Lazzara | A61C 8/0089 81/436 |
| 6,971,877 B2 | 12/2005 | Harter | |
| 8,087,935 B2 | 1/2012 | Beaty et al. | |
| 8,968,002 B2 | 3/2015 | Purga et al. | |
| 9,011,146 B2 | 4/2015 | Suttin et al. | |
| 2004/0219477 A1 | 11/2004 | Harter | |
| 2009/0130630 A1* | 5/2009 | Suttin | A61C 1/084 433/174 |
| 2010/0297574 A1* | 11/2010 | Llop | A61C 1/084 433/75 |
| 2010/0311006 A1* | 12/2010 | Lancieux | A61C 1/084 433/75 |
| 2012/0191103 A1* | 7/2012 | Jorneus | A61B 17/1655 606/96 |

(Continued)

FOREIGN PATENT DOCUMENTS

WO WO-2016043578 A1 * 3/2016 ........... A61C 8/0089

*Primary Examiner* — Heidi M Eide
(74) *Attorney, Agent, or Firm* — Sughrue Mion, PLLC

(57) ABSTRACT

A guide-sleeve is couplable to an oral surgical guide at a fixed rotational orientation, height, and angle with respect to oral anatomy. An implant delivery device, couplable to a dental implant, drives the implant into tissue of the subject by rotation of the delivery device about its longitudinal axis until the delivery device lockingly engages the guide-sleeve. When the implant lockingly engages the guide-sleeve, the implant is disposed in the tissue at a fixed rotational orientation, depth, and angle with respect to the oral anatomy, and any further advancement and rotation of the dental implant with respect to the tissue is prevented. Other embodiments are also described.

11 Claims, 9 Drawing Sheets

(56) References Cited

U.S. PATENT DOCUMENTS

| | | | |
|---|---|---|---|
| 2012/0237898 A1* | 9/2012 | Palti | A61C 8/0025 |
| | | | 433/174 |
| 2012/0237899 A1 | 9/2012 | Holmstrom et al. | |
| 2014/0242545 A1 | 8/2014 | Brun | |
| 2016/0038254 A1* | 2/2016 | Prestipino | A61C 1/084 |
| | | | 433/72 |
| 2017/0239021 A1 | 8/2017 | Klein et al. | |

* cited by examiner

IMPLANT PLACEMENT KEY

CROSS REFERENCE TO RELATED APPLICATIONS

The present application claims the priority of U.S. 62/473,577 to Danziger, filed Mar. 20, 2017, entitled, "Implant Placement Key," which is incorporated herein by reference.

FIELD OF THE INVENTION

The present invention relates to inserting a dental implant into a patient's bone.

BACKGROUND

In order for a prosthetic tooth to sit correctly in a patient's mouth, the abutment onto which the prosthetic tooth is placed should be oriented correctly. Therefore, the dental implant into which the abutment is screwed should be properly oriented within the patient's bone. Typically, in order to achieve correct rotational orientation of a dental implant with respect to the patient's oral anatomy, the dentist will line up a marking on the dental implant with a marking on an oral surgical guide through which the implant is being inserted. Upon these two markings aligning with each other, the dental implant is considered to be in correct rotational position. This method, however, has a margin of human error as it is up to the dentist's discretion to decide when she perceives the two markings to be aligned with each other and to stop any further rotation of the dental implant.

SUMMARY OF THE INVENTION

An implant delivery device is provided for use with a dental implant having a proximal opening shaped to define an implant anti-rotational portion and an oral surgical guide, the size and shape of which has been customized according to oral anatomy of a subject. The customized oral surgical guide is firmly secured to the anatomy, and a guide-sleeve, sized and shaped to be coupled to the customized oral surgical guide at a fixed rotational orientation, height, and angle with respect to the oral anatomy, is inserted into the customized oral surgical guide. A proximal opening of the guide-sleeve is shaped to define an anti-rotational portion as well.

A distal portion of the implant delivery device has an implant connection element that lockingly engages the implant anti-rotational portion such that the dental implant is couplable to the distal end of the implant delivery device at a predetermined rotational orientation of the dental implant with respect to the implant delivery device. The dental implant is then advanced into the patient's tissue by sliding the implant into the guide-sleeve and then rotating the implant delivery device about a longitudinal axis of the implant delivery device. A proximal portion of the implant delivery device has a guide-sleeve connection element that lockingly engages the anti-rotational portion of the guide-sleeve once the implant has reached its correct rotational orientation, depth, and angle with respect to the oral anatomy, such that any further advancement or rotation of the dental implant is prevented.

The rotational orientation of the implant connection element is fixed with respect to the rotational orientation of the guide-sleeve connection element. The customization of the oral surgical guide, the dental implant orientation being fixed with respect to the implant delivery device, and the rotation of the dental implant being forced to stop when the implant delivery device lockingly engages the guide-sleeve, together result in the dental implant being easily advanced into the patient's tissue to a predetermined rotational orientation, height, and angle with respect to the oral anatomy of the patient.

There is therefore provided, in accordance with some applications of the present invention, apparatus for use with (i) a dental implant, a proximal opening of the dental implant being shaped to define an implant anti-rotational portion, and (ii) an oral surgical guide, the size and shape of the oral surgical guide being customized according to oral anatomy of a subject and having an attachment surface configured to firmly secure the oral surgical guide to the oral anatomy, the apparatus including:

a guide-sleeve, sized and shaped to be coupled to the customized oral surgical guide at a fixed rotational orientation, height, and angle with respect to the oral anatomy when the attachment surface is firmly secured to the oral anatomy, wherein a proximal opening of the guide-sleeve is shaped to define a guide-sleeve anti-rotational portion; and an implant delivery device, couplable to the dental implant and configured to drive the dental implant into tissue of the subject by rotation of the implant delivery device about a longitudinal axis of the implant delivery device, a distal portion of the implant delivery device comprising an implant connection element configured to lockingly engage the implant anti-rotational portion, such that the dental implant is couplable to the implant delivery device in only one rotational orientation of the dental implant with respect to the implant delivery device, and a proximal portion of the implant delivery device comprising a guide-sleeve connection element configured to lockingly engage the guide-sleeve anti-rotational portion upon advancement of the implant delivery device a certain distance into the guide-sleeve, such that any further advancement and rotation of the implant delivery device is prevented upon the guide-sleeve-connection element lockingly engaging the guide-sleeve anti-rotational portion, wherein, when the dental implant is coupled to the implant delivery device, (i) a rotational orientation of the implant connection element is fixed with respect to a rotational orientation of the guide-sleeve connection element and (ii) the rotational orientation, height, and angle of the guide-sleeve with respect to the oral anatomy is fixed by the customized oral surgical guide, such that upon the guide-sleeve connection element lockingly engaging the guide-sleeve anti-rotational portion, the dental implant is disposed in the tissue of the subject at a fixed rotational orientation, depth, and angle with respect to the oral anatomy of the subject, and any further advancement and rotation of the dental implant with respect to the tissue is prevented.

For some applications, the implant connection element is one of a plurality of implant connection elements configured to lockingly engage a plurality of implant anti-rotational portions of a plurality of dental implants, respectively, the apparatus includes a kit, and a plurality of implant delivery devices, each implant delivery device having a respective one of the plurality of implant connection elements, are disposed within the kit.

For some applications, the guide-sleeve is configured to guide a dental drill during drilling into the tissue of the subject.

For some applications, the guide-sleeve is configured to be coupled to the customized oral surgical guide at a fixed rotational orientation of the guide-sleeve with respect to the customized oral surgical guide.

For some applications, the apparatus further includes the oral surgical guide.

For some applications, (a) an opening in the customized oral surgical guide is shaped to define a surgical guide anti-rotational portion, and (b) the guide-sleeve further includes a surgical guide connection element disposed on an external lateral surface of the guide-sleeve and configured to lockingly engage the surgical guide anti-rotational portion, such that the guide-sleeve is couplable to the customized oral surgical guide in only one rotational orientation of the guide-sleeve with respect to the customized oral surgical guide.

For some applications, the implant delivery device includes a fastening screw, a proximal end of the fastening screw being disposed at the proximal end of the implant delivery device and a distal end of the fastening screw protruding from the distal end of the implant delivery device and being configured to engage threading disposed in the proximal opening of the dental implant, wherein the fastening screw is rotatable with respect to the implant delivery device.

For some applications, the proximal end of the implant delivery device includes a knob, configured to rotate the fastening screw with respect to the implant delivery device.

For some applications, the apparatus is for use with a rotator element, the proximal portion of the implant further includes an implant-delivery-device/rotator-element interface, configured to be coupled to the rotator element, and rotation of the implant-delivery-device/rotator-element interface rotates the implant delivery device about a longitudinal axis of the implant delivery device.

For some applications, the apparatus is for use with a ratchet handle, and the implant-delivery-device/rotator-element interface is configured to be coupled to the ratchet handle, such that rotation of the ratchet handle rotates the implant delivery device about a longitudinal axis of the implant delivery device.

For some applications, the apparatus is for use with a dental handpiece, and the implant-delivery-device/rotator-element interface is configured to be coupled to the dental handpiece such that activation of the dental handpiece rotates the implant delivery device about a longitudinal axis of the implant delivery device.

For some applications, the apparatus is for use with a gear-wheel, and the implant-delivery-device/rotator-element interface is configured to be coupled to the gear-wheel such that rotation of the gear-wheel about a longitudinal axis of the gear-wheel rotates the implant delivery device about a longitudinal axis of the implant delivery device.

For some applications, the apparatus is for use with a screwdriver handle, and the implant-delivery-device/rotator-element interface is configured to be coupled to the screwdriver handle such that rotation of the screwdriver handle about a longitudinal axis of the screwdriver handle rotates the implant delivery device about a longitudinal axis of the implant delivery device.

For some applications, the proximal portion of the implant delivery device further includes an elastic element which is: (a) in a deformed state and (b) configured to advance the guide-sleeve connection element towards the guide-sleeve by applying a force in a distal direction to the guide-sleeve connection element as the implant-delivery-device/rotator-element interface is rotated about the longitudinal axis of the implant delivery device.

For some applications, the elastic element is (a) disposed between the implant-delivery-device/rotator-element interface and the guide-sleeve connection element, and (b) in contact with both the implant-delivery-device/rotator-element interface and the guide-sleeve connection element.

For some applications, the implant delivery device includes a guiding shank, disposed between the guide-sleeve connection element and the implant connection element, and configured to slidingly engage the guide-sleeve until the guide-sleeve connection element lockingly engages the guide-sleeve anti-rotational portion.

For some applications, a diameter of the guiding shank is 3-7 mm.

For some applications, a diameter of the guiding shank is 10-250 microns less than an inner diameter of the guide-sleeve.

For some applications, a length of the guiding shank is 4-20 mm.

For some applications,
the length of the guiding shank is one of a plurality of lengths, each length corresponding to a respective depth of the dental implant in the tissue upon the guide-sleeve connection element lockingly engaging the guide-sleeve anti-rotational portion,
the apparatus includes a kit, and
a plurality of implant delivery devices, the guiding shank of each implant delivery device having a respective one of the plurality of lengths, are disposed within the kit.

There is further provided, in accordance with some applications of the present invention, a method for inserting a dental implant into tissue of a subject via an oral surgical guide that is customized to oral anatomy of the subject, the method including:
inserting a guide-sleeve into the customized oral surgical guide;
placing the customized oral surgical guide over an implant site;
coupling the dental implant to an implant delivery device; and
subsequently, advancing the dental implant into the tissue by rotating the implant delivery device about a longitudinal axis of the implant delivery device until the implant delivery device lockingly engages the guide-sleeve, such that any further advancement and rotation of the implant with respect to the tissue is prevented.

For some applications, advancing the dental implant includes advancing the dental implant to a predetermined rotational orientation, depth, and angle with respect to the oral anatomy of the subject.

For some applications, placing the customized oral surgical guide includes placing the customized oral surgical guide over the implant site such that an opening in the customized oral surgical guide holds the guide-sleeve at a predetermined rotational orientation, height, and angle of the guide-sleeve with respect to the oral anatomy.

For some applications, inserting the guide-sleeve includes assessing the oral anatomy, and according to the assessment, inserting a guide-sleeve having a guide-sleeve anti-rotational portion into the opening of the customized oral surgical guide at a predetermined rotational orientation of the guide-sleeve with respect to the customized oral surgical guide.

For some applications, inserting the guide-sleeve includes lockingly engaging a surgical guide connection element disposed on an external lateral surface of the guide-sleeve to a surgical guide anti-rotational element defined in the opening of the customized oral surgical guide.

For some applications, coupling includes coupling the dental implant to a distal portion of the implant delivery device at a predetermined rotational orientation of the dental implant with respect to the implant delivery device.

For some applications, coupling includes lockingly engaging an implant connection element disposed on the distal portion of the implant delivery device to an implant anti-rotational element defined in a proximal opening of the dental implant.

For some applications, the method further includes selecting (i) an implant delivery device having an implant connection element configured to lockingly engage the implant anti-rotational portion, from among (ii) a plurality of implant delivery devices having a respective plurality of implant connection elements configured to lockingly engage a respective plurality of implant anti-rotational portions.

For some applications, coupling includes rotating a fastening screw disposed inside the implant delivery device, a proximal end of the fastening screw being disposed at a proximal end of the implant delivery device and a distal end of the fastening screw protruding from the distal portion of the implant delivery device and engaging threading disposed in the proximal opening of the dental implant.

For some applications, rotating the fastening screw includes rotating the fastening screw with respect to the implant delivery device by rotating a knob disposed at the proximal end of the implant delivery device.

For some applications, the method further includes lowering the dental implant through the guide-sleeve into the implant site, and subsequently advancing the dental implant by rotating the implant delivery device about a longitudinal axis of the implant delivery device.

For some applications, lowering the dental implant through the guide-sleeve includes sliding a guiding shank of the implant delivery device, disposed proximal to the implant connection element, into the guide-sleeve, the guiding shank slidingly engaging the guide-sleeve during the rotation of the implant delivery device.

For some applications, sliding the guiding shank includes sliding a guiding shank having a diameter of 3-7 mm.

For some applications, sliding the guiding shank includes sliding a guiding shank having a diameter that is 10-250 microns less than an inner diameter of the guide-sleeve.

For some applications, sliding the guiding shank includes sliding a guiding shank having a length of 4-20 mm.

For some applications, the method further includes selecting (i) an implant delivery device having a guiding shank length that corresponds to a respective depth of the dental implant in the tissue upon the implant delivery device lockingly engaging the guide-sleeve, from among (ii) a plurality of implant delivery devices having guiding shanks of a plurality of respective lengths.

For some applications, rotating the implant delivery device includes rotating the implant delivery device until a guide-sleeve connection element, disposed on a proximal portion of the implant delivery device, lockingly engages the guide-sleeve such that any further advancement and rotation of the dental implant with respect to the tissue is prevented.

For some applications, rotating the implant delivery device includes coupling a rotator element to an implant-delivery-device/rotator-element interface disposed on the proximal portion of the implant delivery device, and rotating the implant-delivery-device/rotator-element interface about the longitudinal axis of the implant delivery device.

For some applications, rotating the implant delivery device includes coupling a ratchet handle to the implant-delivery-device/rotator-element interface, and subsequently rotating the ratchet handle about the longitudinal axis of the implant delivery device.

For some applications, rotating the implant delivery device includes coupling a dental handpiece to the implant-delivery-device/rotator-element interface, and subsequently activating the dental handpiece.

For some applications, rotating the implant delivery device includes coupling a gear-wheel to the implant-delivery-device/rotator-element interface, and subsequently rotating the gear-wheel about a longitudinal axis of the gear-wheel.

For some applications, rotating the implant delivery device includes coupling a screwdriver handle to the implant-delivery-device/rotator-element interface, and subsequently rotating the screwdriver handle about a longitudinal axis of the screwdriver handle.

For some applications, rotating the implant delivery device includes rotating an implant delivery device including an elastic element which is (a) in a deformed stated and (b) configured to advance the guide-sleeve connection element towards the guide-sleeve by applying a force in a distal direction to the guide-sleeve connection element as the implant-delivery-device/rotator-element interface is rotated about the longitudinal axis of the implant delivery device.

For some applications, the elastic element is (a) disposed between the implant-delivery-device/rotator-element interface and the guide-sleeve connection element, and (b) in contact with both the implant-delivery-device/rotator-element interface and the guide-sleeve connection element.

The present invention will be more fully understood from the following detailed description of applications thereof, taken together with the drawings, in which:

DETAILED DESCRIPTION

Figure 1:
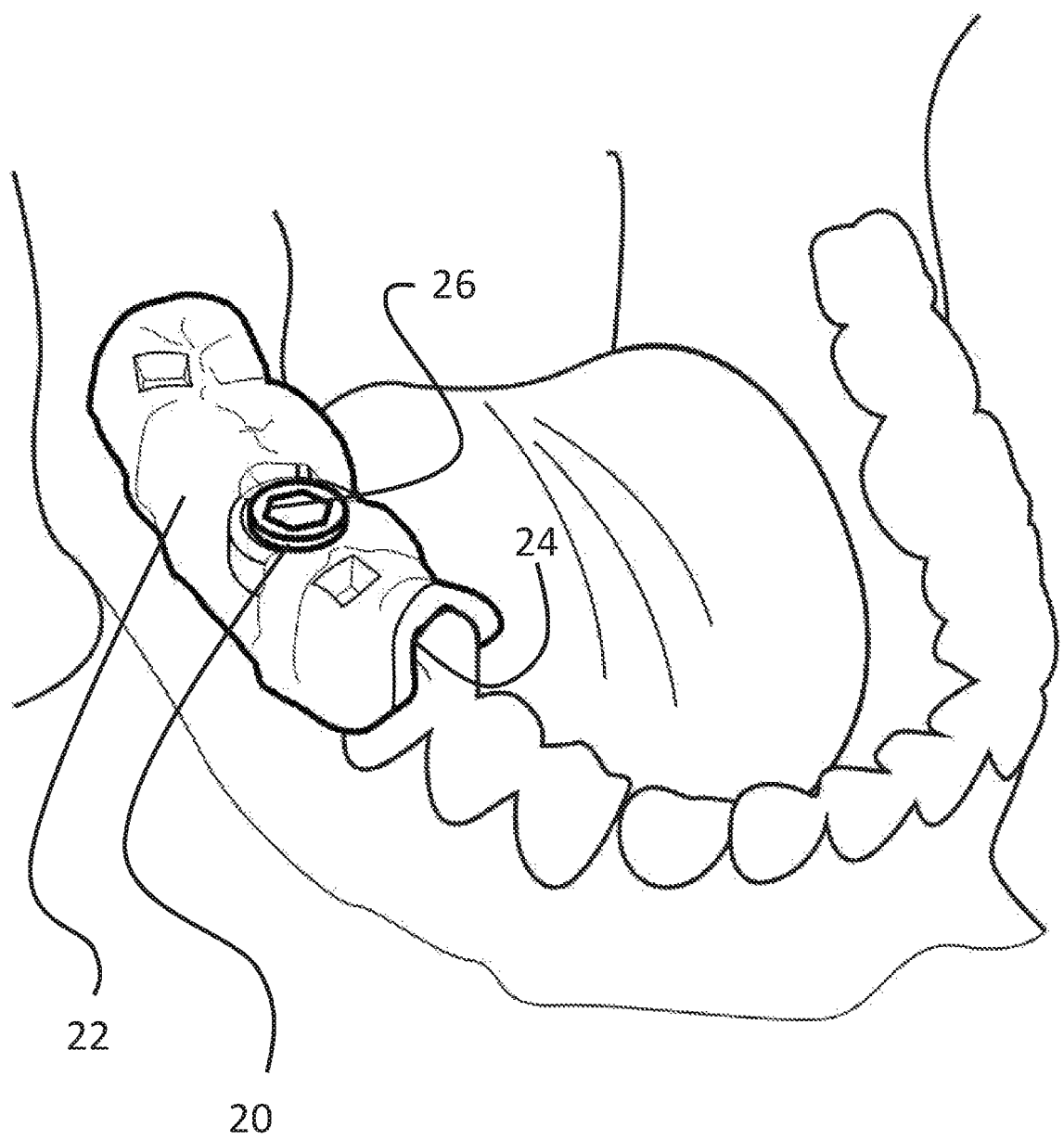
FIG. 1 is a schematic illustration of a customized oral surgical guide positioned over an implant site, and a guide-sleeve disposed in the customized oral surgical guide.

Reference is now made to FIG. 1, which is a schematic illustration of a guide-sleeve 20 disposed in an oral surgical guide 22, in accordance with some applications of the present invention. The size and shape of oral surgical guide 22 are customized according to oral anatomy of a subject. Oral surgical guide 22 typically has an attachment surface 24 configured to firmly secure oral surgical guide 22 to the oral anatomy. Guide-sleeve 20 is sized and shaped to be coupled to customized oral surgical guide 22 at a fixed rotational orientation, height, and angle with respect to the oral anatomy when attachment surface 24 is firmly secured to the oral anatomy. An opening of guide-sleeve 20 is shaped to define a guide-sleeve anti-rotational portion 26. Guide-sleeve 20 may be inserted into customized oral surgical guide 22 either before or after customized oral surgical guide 22 is placed over an implant site.

Figure 2:
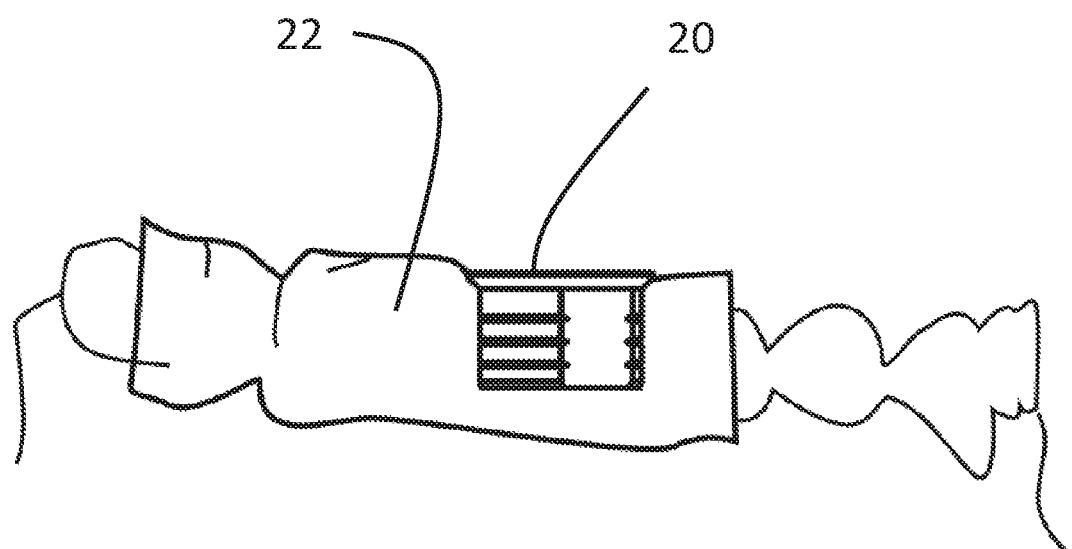
FIG. 2 is a schematic illustration of a side-view of the guide-sleeve coupled to the oral surgical guide, which is positioned over the implant site.
Figure 3:
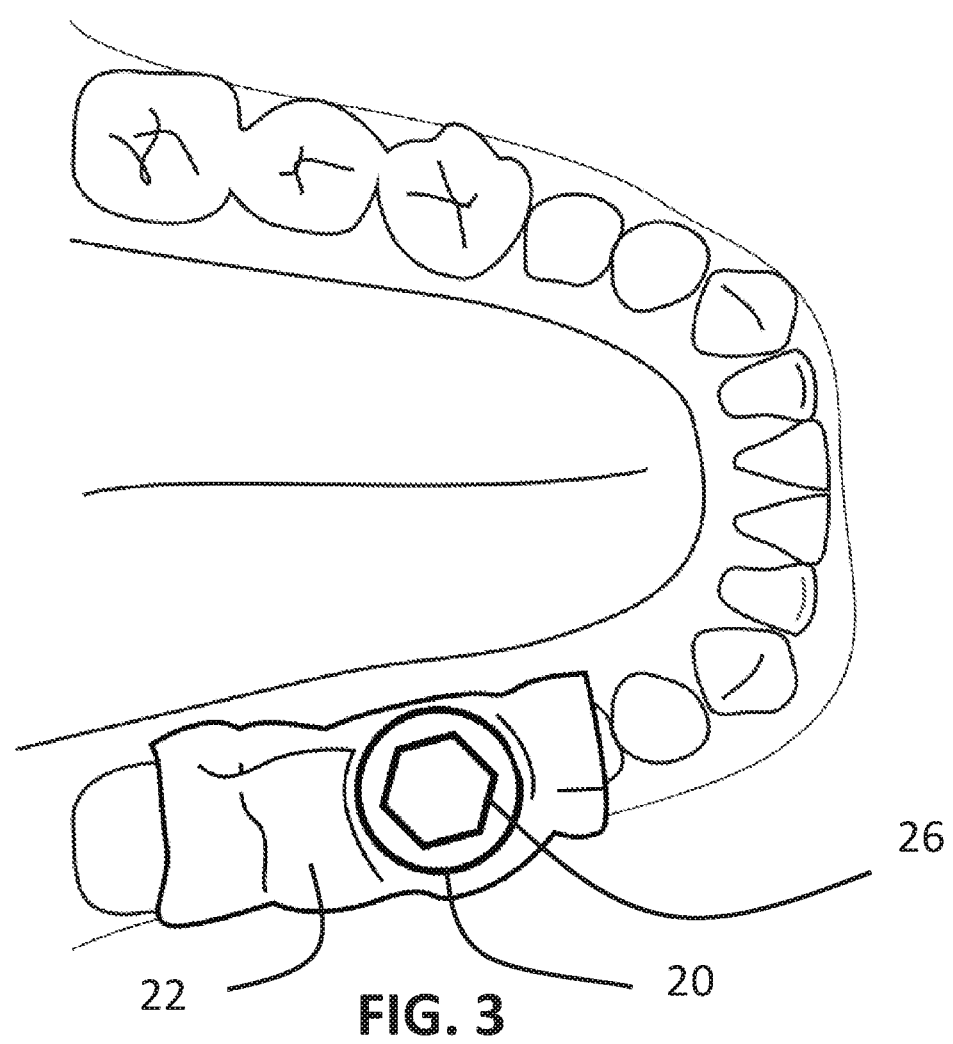
FIG. 3 is a schematic illustration of a top-view of the guide-sleeve coupled to the oral surgical guide, which is positioned over the implant site.

Reference is now made to FIGS. 2 and 3, which are schematic illustrations of customized oral surgical guide 22 and guide-sleeve 20, in accordance with some applications of the present invention. FIG. 2 is a side view of guide-sleeve 20 disposed in customized oral surgical guide 22, and FIG. 3 is a top view of guide-sleeve 20 disposed in customized oral surgical guide 22.

Figure 4:
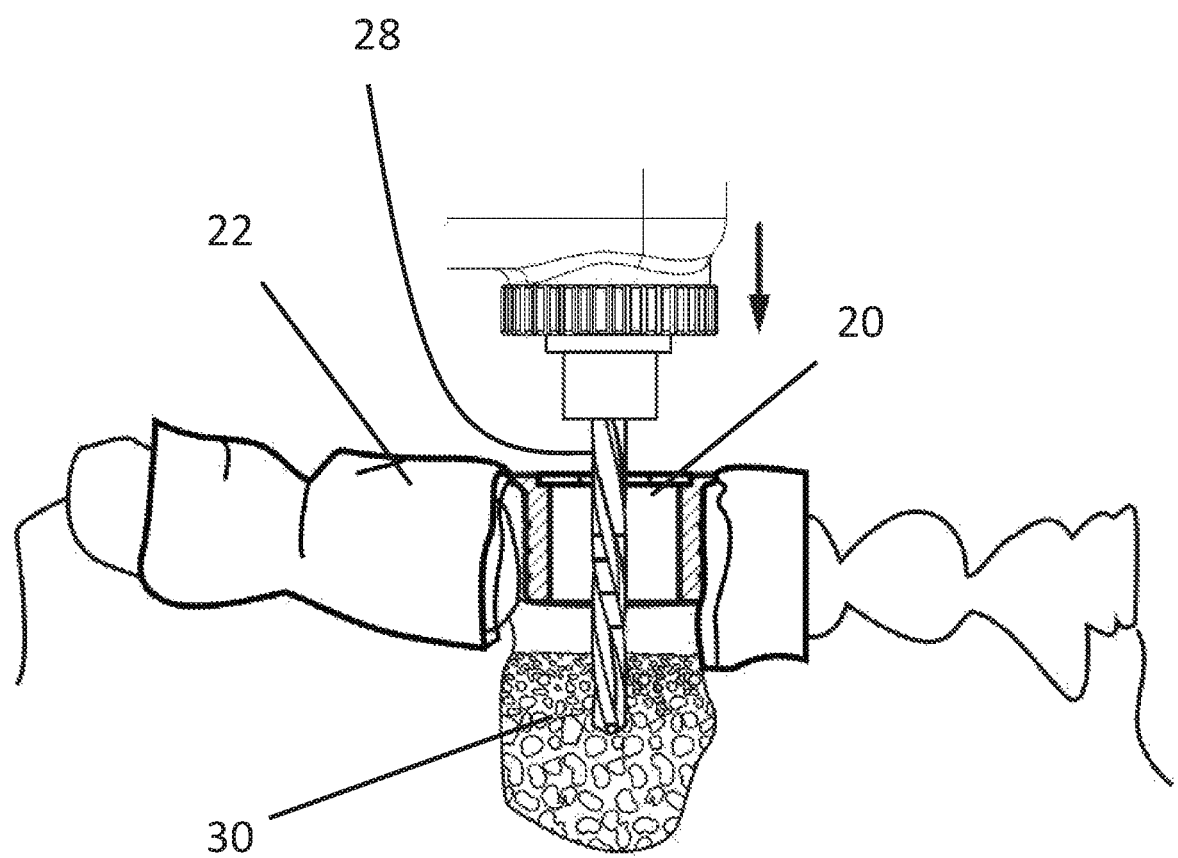
FIG. 4 is a schematic illustration of the guide-sleeve being used to guide a dental drill.

Reference is now made to FIG. 4, which is a schematic illustration of a dental drill 28 and guide-sleeve 20, in accordance with some applications of the present invention. For some applications, guide-sleeve 20 is configured to guide dental drill 28 during drilling into tissue 30 of the subject.

Figure 5:
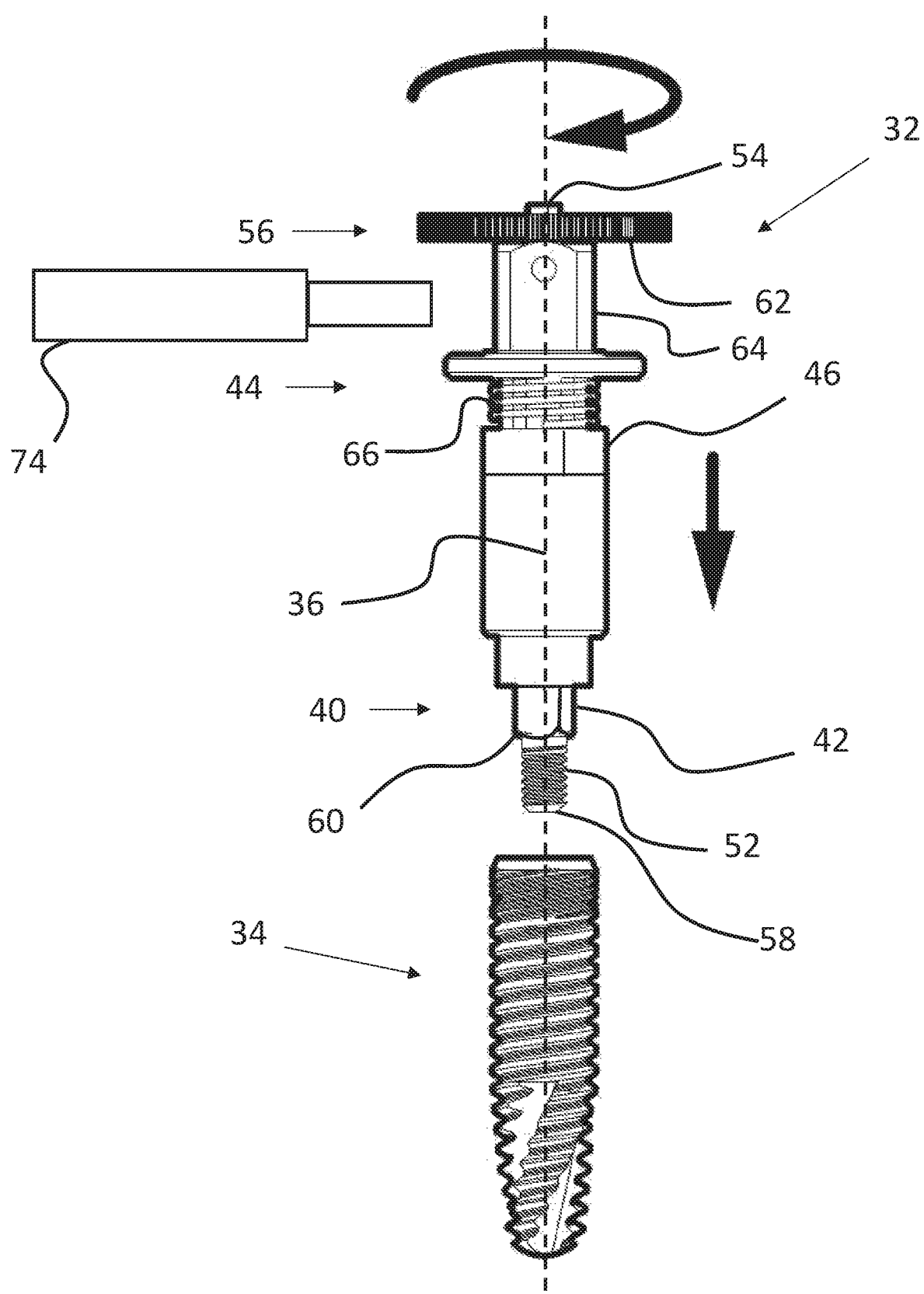
FIG. 5 is a schematic illustration of an implant delivery device suspended above a dental implant that is couplable to the distal end of the implant delivery device.

Reference is now made to FIG. 5, which is a schematic illustration of an implant delivery device 32 for use with a dental implant 34, in accordance with some applications of the present invention. When coupled to dental implant 34, implant delivery device 32 drives dental implant 34 through guide-sleeve 20 into tissue 30 of the subject by rotation of implant delivery device 32 about a longitudinal axis 36 of implant delivery device 32. Respective features, described hereinbelow, of dental implant 34, implant delivery device 32, guide-sleeve 20, and customized oral surgical guide 22 combine to allow easy insertion and advancement of dental implant 34 to a predetermined rotational orientation, height, and angle with respect to the oral anatomy of the subject.

Figure 6:
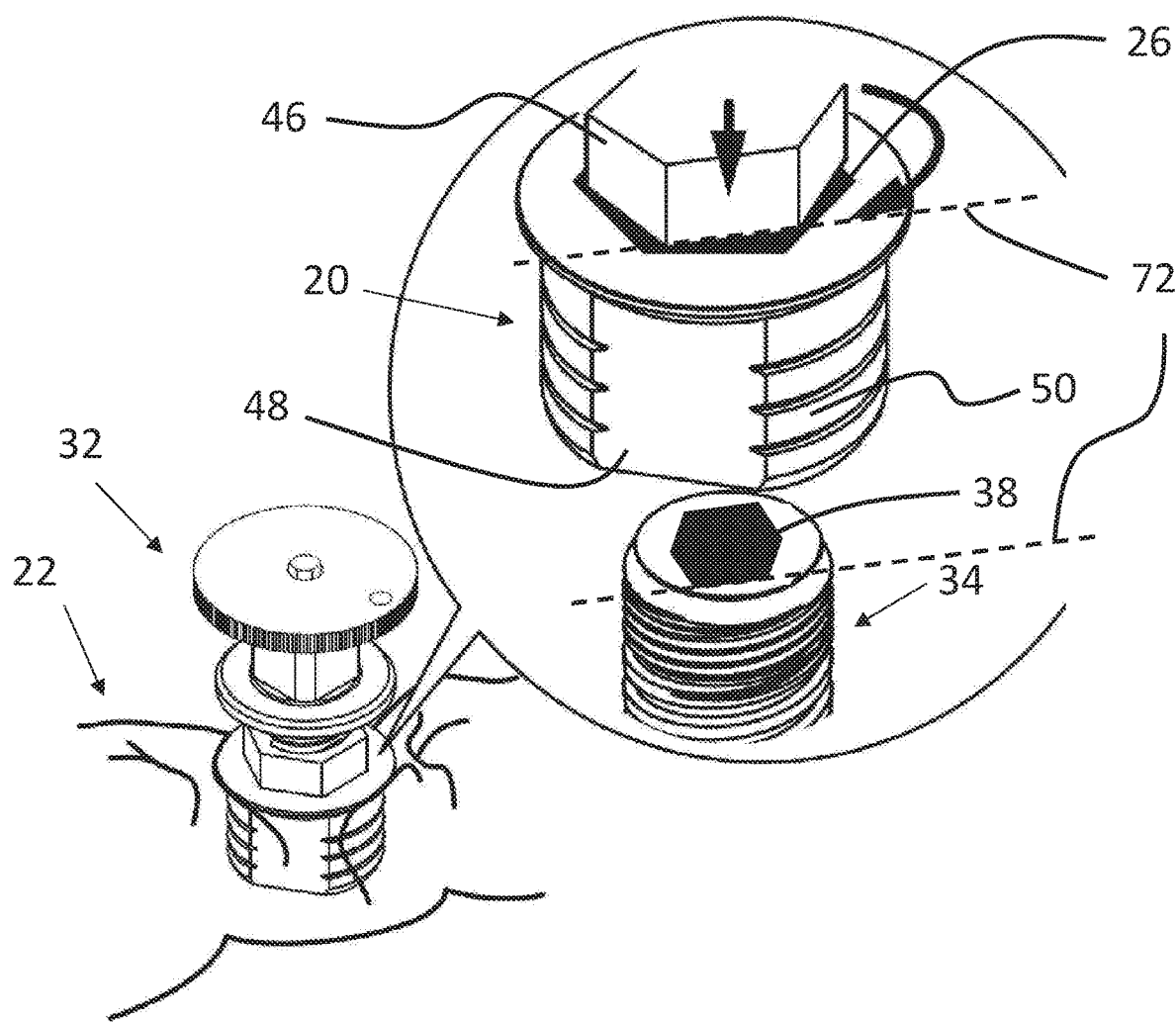
FIG. 6 is a schematic illustration of a guide-sleeve connection element on the implant delivery device lockingly engaging a guide-sleeve anti-rotational portion of the guide-sleeve.

Reference is now made to FIG. 6, which is a schematic illustration of an implant delivery device 32 for use with a dental implant 34, in accordance with some applications of the present invention. A proximal opening of dental implant 34 is typically shaped to define an implant anti-rotational portion 38, and a distal portion 40 of implant delivery device 32 typically comprises an implant connection element 42 (FIG. 5). Implant connection element 42 is configured to lockingly engage implant anti-rotational portion 38, such that dental implant 34 is couplable to implant delivery device 32 in only one rotational orientation of dental implant 34 with respect to implant delivery device 32 (or, alternatively, in a small, discrete number of rotational orientations of dental implant 34 with respect to implant delivery device 32, such as 2, 3, 4, 5, 6, 7, or 8). A proximal portion 44 of implant delivery device 32 typically comprises a guide-sleeve connection element 46 which is configured to lockingly engage guide-sleeve anti-rotational portion 26 upon advancement of implant delivery device 32 a certain distance into guide-sleeve 20, such that any further advancement and rotation of implant delivery device 32 is prevented.

In FIG. 6, guide-sleeve connection element 46 is shown as it is about to lockingly engage guide-sleeve anti-rotational portion 26.

The rotational orientation of implant connection element 42 is fixed with respect to the rotational orientation of guide-sleeve connection element 46 (FIG. 5), and thereby fixed with respect to implant anti-rotational portion 38 (FIG. 6) when dental implant 34 is coupled to implant delivery device 32. Dashed lines 72 in FIG. 6 show the fixed rotational relationship between guide-sleeve connection element 46 and implant anti-rotational portion 38 when dental implant 34 is coupled to implant delivery device 32. The final rotational orientation, height, and angle of dental implant 34 with respect to the oral anatomy are thereby fixed by the rotational orientation, height, and angle of guide-sleeve connection element 46 as it lockingly engages guide-sleeve 20 disposed in customized oral surgical guide 22. The rotational orientation, height, and angle of guide-sleeve 20 with respect to the oral anatomy are, in turn, fixed by customized oral surgical guide 22, positioned over the implant site.

Therefore, upon guide-sleeve connection element 46 lockingly engaging guide-sleeve anti-rotational portion 26, dental implant 34 is disposed in tissue 30 of the subject at a fixed rotational orientation, depth, and angle with respect to the oral anatomy of the subject, such that any further advancement and rotation of dental implant 34 with respect to tissue 30 is prevented.

Figure 7:
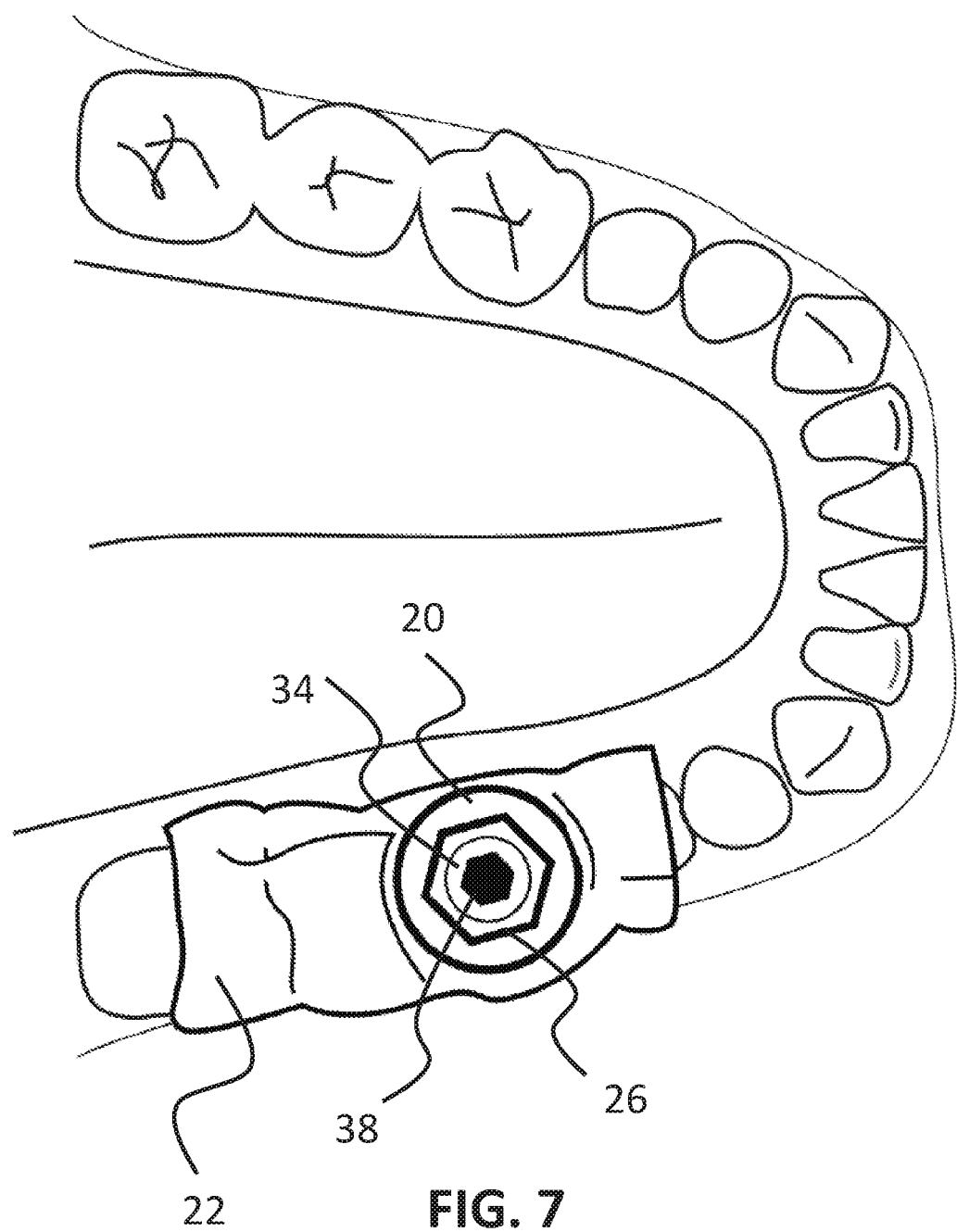
FIG. 7 is a schematic illustration of a top view of the dental implant inside the guide-sleeve once the implant has been inserted into the patient's bone.
Figure 8:
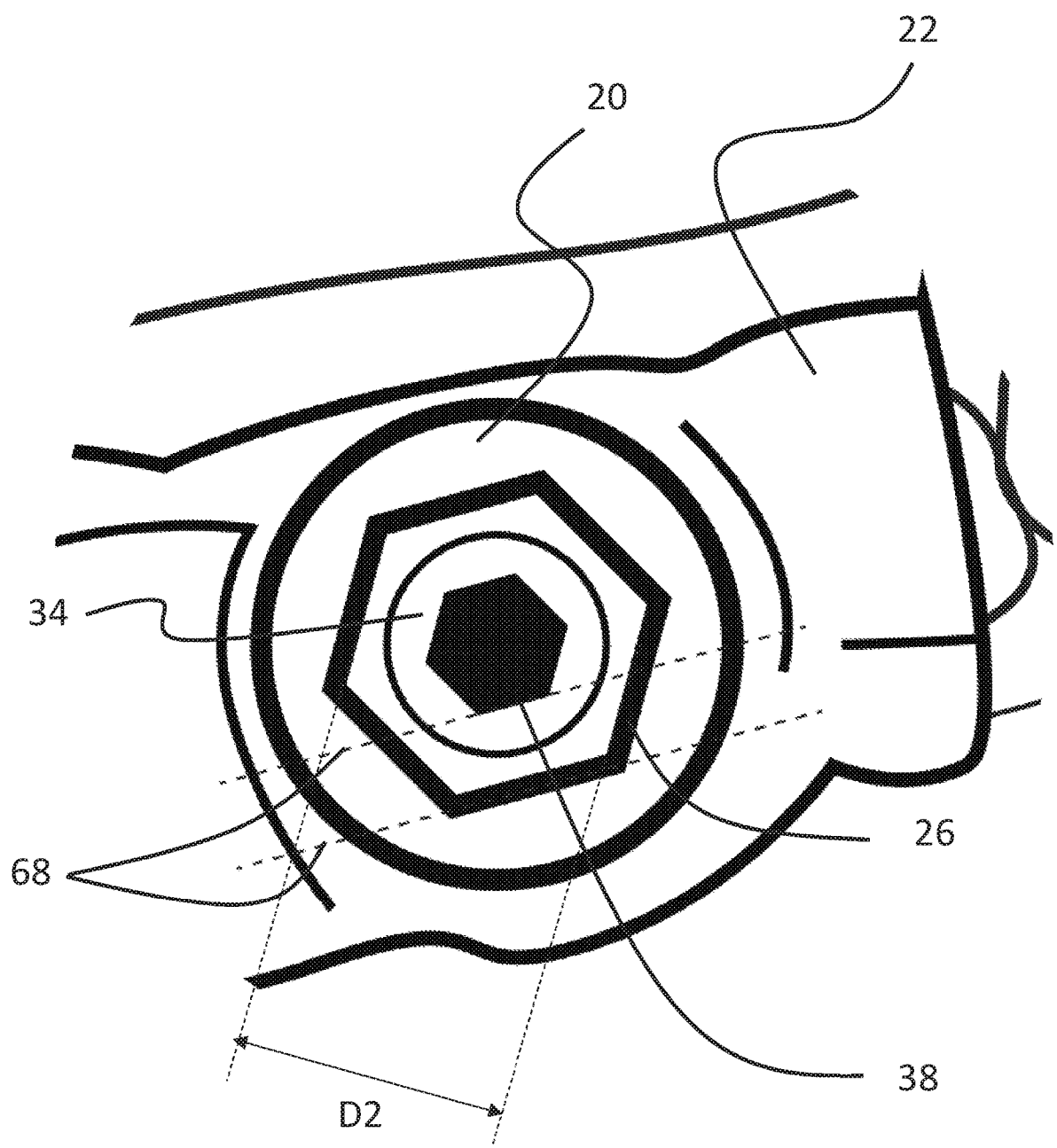
FIG. 8 is an enlarged version of FIG. 7 showing how the rotational orientation of the implant anti-rotational portion is fixed with respect to the rotational orientation of the guide-sleeve anti-rotational portion.

Reference is now made to FIGS. 7 and 8, which are schematic illustrations of a top-view of dental implant 34 fully inserted into tissue 30, with customized oral surgical guide 22 and guide-sleeve 20 still in place. The alignment of implant anti-rotational portion 38 with guide-sleeve anti-rotational portion 26 is highlighted by dashed lines 68.

For some applications, an opening in customized oral surgical guide 22 is shaped to define a surgical guide anti-rotational portion (not shown), and guide-sleeve 20 comprises a surgical guide connection element 48 (FIG. 6) disposed on an external lateral surface 50 of guide-sleeve 20. Surgical guide connection element 48 is configured to lockingly engage the surgical guide anti-rotational portion, such that (a) guide-sleeve 20 is couplable to customized oral surgical guide 22 in only one rotational orientation of guide-sleeve 20 with respect to customized oral surgical guide 22, and (b) upon guide-sleeve 20 being inserted into customized oral surgical guide 22, guide-sleeve 20 is prevented from swiveling with respect to the opening of customized oral surgical guide 22. Once guide-sleeve 20 is inserted into customized oral surgical guide 22, the opening in customized oral surgical guide 22 holds guide-sleeve 20 at a predetermined rotational orientation, height, and angle with respect to the oral anatomy.

For other applications, when guide-sleeve 20 and the opening in customized oral surgical guide 22 do not lockingly engage, the dentist assesses the oral anatomy, and inserts guide-sleeve 20 into the opening of customized oral surgical guide 22 at a predetermined rotational orientation of guide-sleeve 20 with respect to customized oral surgical guide 22 according to the assessment.

Reference is again made to FIG. 5. For some applications, implant delivery device 32 comprises a fastening screw 52 disposed inside implant delivery device 32. A proximal end 54 of fastening screw 52 is disposed at a proximal end 56 of implant delivery device 32, and a distal end 58 of fastening screw 52 protrudes from a distal end 60 of implant delivery device 32. Fastening screw 52 is rotatable with respect to implant delivery device 32, and distal end 58 of fastening screw 52 is configured to engage threading disposed in the proximal opening of dental implant 34 (not shown). Dental implant 34 is coupled to implant delivery device 32 by first inserting implant connection element 42 into implant anti-rotational portion 38, and subsequently rotating fastening screw 52 to engage the threading in the proximal opening in order to fasten dental implant 34 to implant delivery device 32. After dental implant 34 has been fully advanced in tissue 30 of the subject, fastening screw 52 can be rotated in the opposite direction in order to release dental implant 34 from implant delivery device 32. For some applications, proximal end 56 of implant delivery device 32 comprises a knob 62, configured to rotate fastening screw 52 with respect to implant delivery device 32. In FIG. 8, dental implant 34 can be seen from a top-view after it has been fully advanced into tissue 30 and released from implant delivery device 32.

For some applications, a rotator element 74 can be coupled to an implant-delivery-device/rotator-element interface 64 disposed on a proximal portion 44 of implant delivery device 32. For example, implant-delivery-device/rotator-element interface 64 can be coupled to a ratchet handle, a dental handpiece, a gear-wheel, and/or a screwdriver handle. Rotation of implant-delivery-device/rotator-element interface 64 rotates implant delivery device 32 about longitudinal axis 36 of implant delivery device 32, thereby driving dental implant 34 into tissue 30. It is noted that use of a slash does not imply an alternative, rather that the interface is between the implant delivery device and the rotator element.

For some applications, implant delivery device 32 further comprises an elastic element 66 (e.g., a helical spring) in a deformed state (e.g., contracted). Elastic element 66 is disposed such that as implant-delivery-device/rotator-element interface 64 is rotated about longitudinal axis 36, elastic element 66 advances guide-sleeve connection element 46 towards guide-sleeve 20 by applying a force in a distal direction to guide-sleeve connection element 46, such that as guide-sleeve connection element 46 approaches guide-sleeve 20, the force from elastic element 66 lockingly engages guide-sleeve connection element 46 to guide-sleeve anti-rotational portion 26. For example, as shown in FIG. 5, elastic element 66 may be disposed between implant-delivery-device/rotator-element interface 64 and guide-sleeve connection element 46, in contact with both implant-delivery-device/rotator-element interface 64 and guide-sleeve connection element 46.

Figure 9:
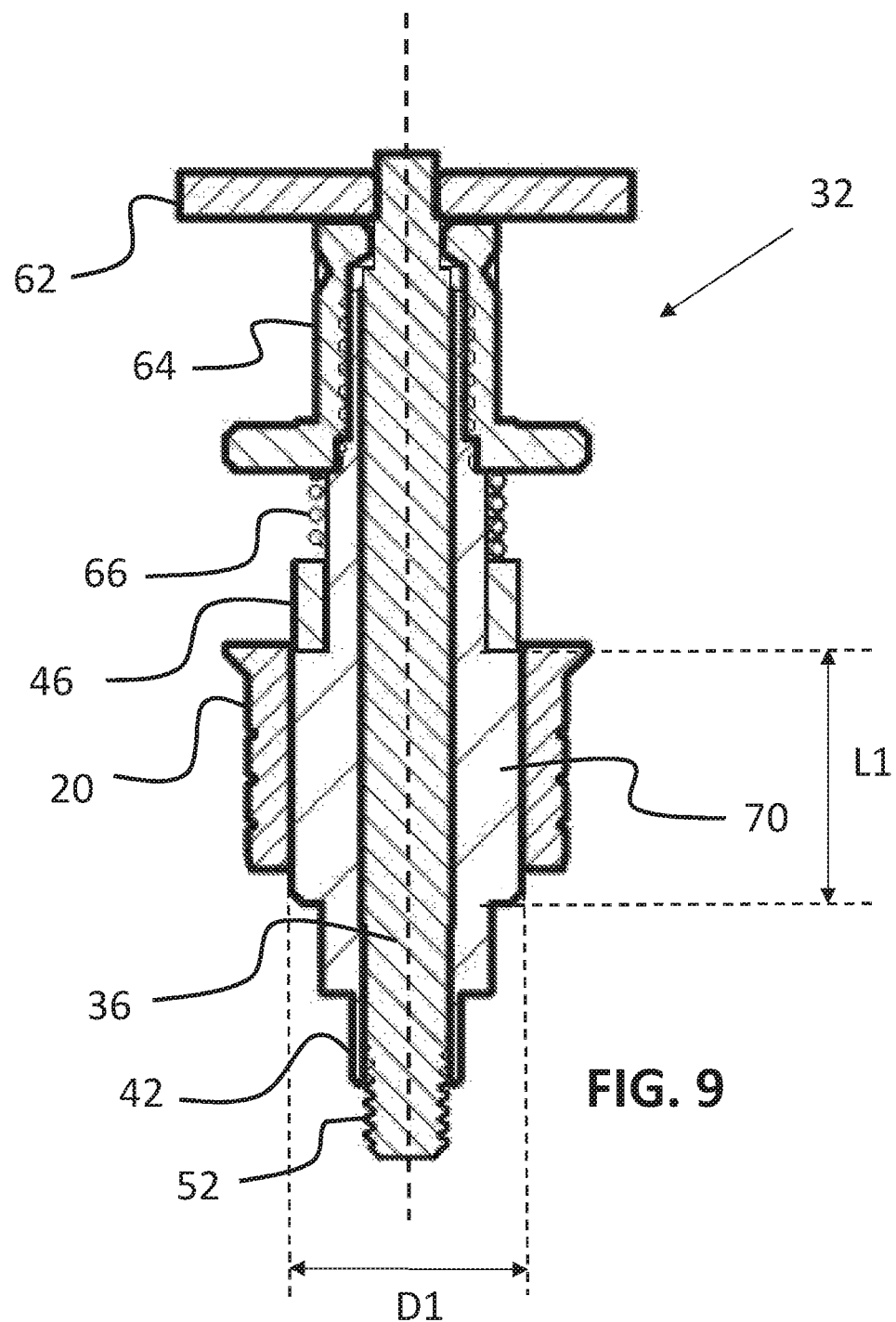
FIG. 9 is a schematic illustration of a cross-section of the implant delivery device.

Reference is now made to FIG. 9, which is a schematic illustration of a cross-section of implant delivery device 32, in accordance with some applications of the present invention. For some applications, implant delivery device 32 comprises a guiding shank 70, disposed between guide-sleeve connection element 46 and implant connection element 42. Once dental implant 34 is coupled to implant delivery device 32, dental implant 34 is lowered through guide-sleeve 20, such that guiding shank 70 slides through guide-sleeve 20. Implant delivery device 32 is then rotated about longitudinal axis 36 to further advance dental implant 34 into tissue 30.

For some applications, dimensions for guiding shank 70 are as follows:
 a diameter D1 of guiding shank 70 is 3-7 mm,
 a length L1 of guiding shank 70 is 4-20 mm, and/or
 diameter D1 of guiding shank 70 is 10-250 microns less than an inner diameter D2 (FIG. 9) of guide-sleeve 20.

Implant delivery device 32 may be disposed within a kit comprising a plurality of implant delivery devices 32. For some applications, each implant delivery device 32 in the kit has a different respective implant connection element 42, configured to lockingly engage a plurality of different implant anti-rotational portions 38 of a plurality of dental implants 34, respectively. After a dental implant 34 has been selected for use, an implant delivery device 32 having an implant connection element 42 that is configured to lockingly engage the selected dental implant 34 is selected from the kit.

For some applications, guiding shank 70 of each implant delivery device 32 in the kit has a different respective length L1, corresponding to a respective depth of dental implant 34 in tissue 30 once guide-sleeve connection element 46 has lockingly engaged guide-sleeve anti-rotational portion 26 of guide-sleeve 20. After the oral anatomy of the patient has been assessed, and oral surgical guide 22 customized according to the oral anatomy, an implant delivery device 32 having a guiding shank length L1 corresponding to the predetermined and final depth of dental implant 34 in tissue 30 is selected from the kit.

Figure 10:
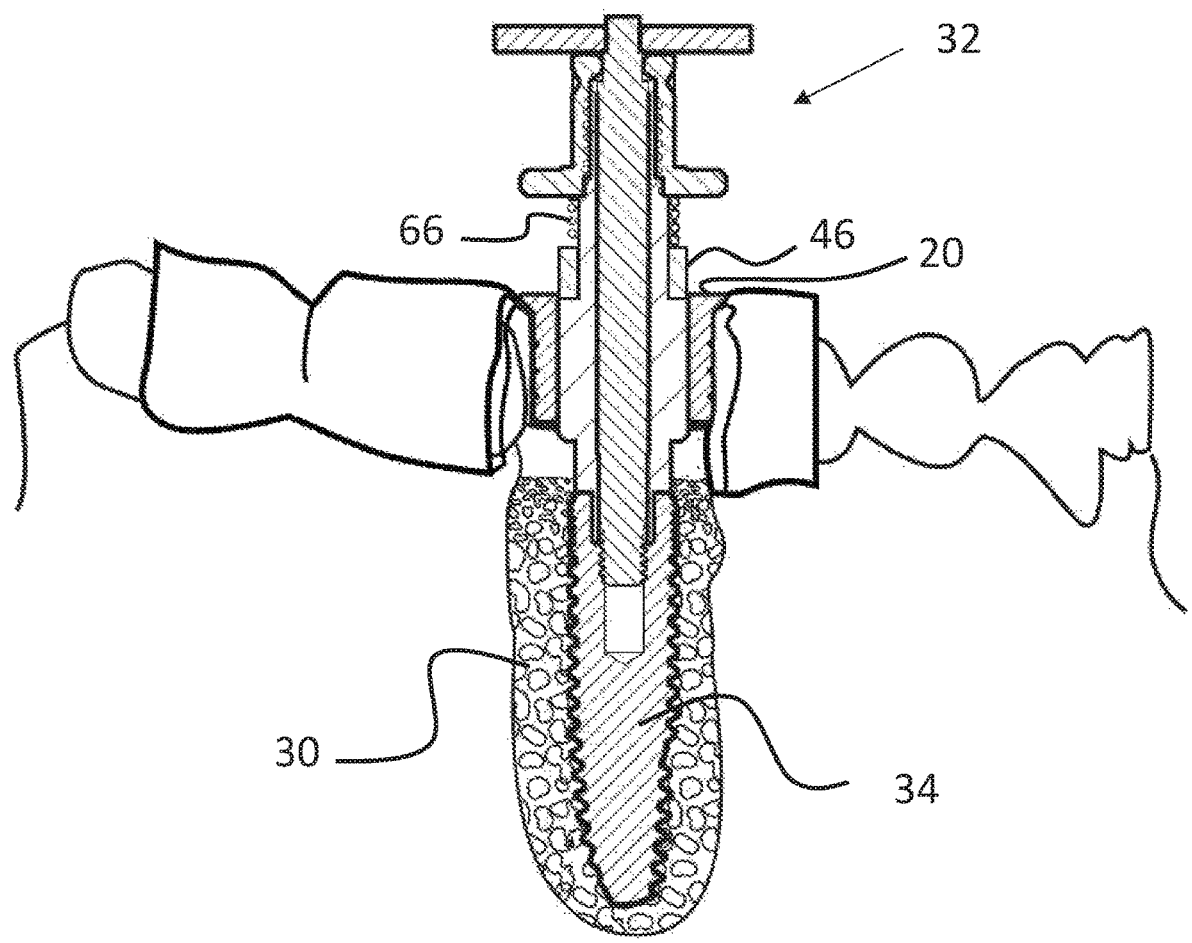
FIG. 10 is a schematic illustration of a cross-section of the dental implant coupled to the implant delivery device once the implant has been inserted into a patient's bone.

Reference is now made to FIG. 10, which is a schematic illustration of implant delivery device 32 and dental implant 34, in accordance with some applications of the present invention. Dental implant 34 is shown coupled to implant delivery device 32 after being inserted into tissue 30 of the subject. Guide-sleeve connection element 46 has just begun to engage guide-sleeve anti-rotational portion 26 of guide-sleeve 20 and a distally-directed force from elastic element 66 will drive guide-sleeve connection element 46 the rest of the way into guide-sleeve anti-rotational portion 26 of guide-sleeve 20, such that any further rotation of implant delivery device 32 and advancement of dental implant 34 with respect to tissue 30 is prevented.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for inserting a dental implant into tissue of a subject via an oral surgical guide that is customized to oral anatomy of the subject, the method comprising:
 inserting a guide-sleeve into the customized oral surgical guide, the guide-sleeve having a non-circular lumen at a proximal end thereof;
 placing the customized oral surgical guide over an implant site;
 coupling the dental implant to an implant delivery device; and
 subsequently, advancing the dental implant into the tissue by rotating the implant delivery device about a longitudinal axis of the implant delivery device until a guide-sleeve connection element, disposed on a proximal portion of the implant delivery device lockingly engages the guide-sleeve, such that the guide-sleeve connection element at least partially enters the non-circular lumen of the guide-sleeve, the guide-sleeve connection element having the same shape as the non-circular lumen such that any further advancement and rotation of the implant with respect to the tissue is prevented,
  wherein rotating the implant delivery device comprises coupling a rotator element to an implant-delivery-device/rotator-element interface disposed on the proximal portion of the implant delivery device, and rotating the implant-delivery-device/rotator-element interface about the longitudinal axis of the implant delivery device, and wherein the implant delivery device comprises an elastic element which is (a) in a deformed state and (b) configured to advance the guide-sleeve connection element towards the guide-sleeve by applying a force in a distal direction to the guide-sleeve connection element as the implant-delivery-device/rotator-element interface is rotated about the longitudinal axis of the implant delivery device.

2. The method according to claim 1, wherein advancing the dental implant comprises advancing the dental implant to a predetermined rotational orientation, depth, and angle with respect to the oral anatomy of the subject.

3. The method according to claim 1, wherein coupling the dental implant to the implant delivery device comprises coupling the dental implant to a distal portion of the implant delivery device at a predetermined rotational orientation of the dental implant with respect to the implant delivery device.

4. The method according to claim 3, wherein coupling the dental implant to the distal portion of the implant delivery device comprises lockingly engaging an implant connection element disposed on the distal portion of the implant delivery device to an implant anti-rotational element defined in a proximal opening of the dental implant.

5. The method according to claim 3, wherein coupling the dental implant to the distal portion of the implant delivery device comprises rotating a fastening screw disposed inside the implant delivery device, a proximal end of the fastening screw being disposed at a proximal end of the implant delivery device and a distal end of the fastening screw protruding from the distal portion of the implant delivery device and engaging threading disposed in a proximal opening of the dental implant.

6. The method according to claim 5, wherein rotating the fastening screw comprises rotating the fastening screw with respect to the implant delivery device by rotating a knob disposed at the proximal end of the implant delivery device.

7. The method according to claim 1, further comprising lowering the dental implant through the guide-sleeve into the implant site, prior to the advancing of the dental implant by rotating the implant delivery device about the longitudinal axis of the implant delivery device.

8. The method according to claim 7, wherein lowering the dental implant through the guide-sleeve comprises sliding a guiding shank of the implant delivery device, disposed proximal to the implant connection element, into the guide-sleeve, the guiding shank slidingly engaging the guide-sleeve during the rotation of the implant delivery device.

9. The method according to claim 8, wherein the guiding shank has a diameter of 3-7 mm.

10. The method according to claim 8, wherein the guiding shank has a diameter that is 10-250 microns less than an inner diameter of the guide-sleeve.

11. The method according to claim 8, wherein the guiding shank has a length of 4-20 mm.

* * * * *